United States Patent
Latvakoski

(10) Patent No.: US 8,995,438 B2
(45) Date of Patent: Mar. 31, 2015

(54) METHOD AND A DEVICE FOR OPTIMIZING DATA TRANSFER IN A WIRELESS COMMUNICATION NETWORK

(75) Inventor: Juhani Latvakoski, Haukipudas (FI)

(73) Assignee: Teknologian Tutkimuskeskus VTT, Epoo (FI)

( * ) Notice: Subject to any disclaimer, the term of this patent is extended or adjusted under 35 U.S.C. 154(b) by 121 days.

(21) Appl. No.: 13/522,403

(22) PCT Filed: Jan. 12, 2011

(86) PCT No.: PCT/FI2011/050016
§ 371 (c)(1),
(2), (4) Date: Jul. 16, 2012

(87) PCT Pub. No.: WO2011/086235
PCT Pub. Date: Jul. 21, 2011

(65) Prior Publication Data
US 2012/0287820 A1 Nov. 15, 2012

(30) Foreign Application Priority Data
Jan. 14, 2010 (FI) ...................................... 20105022

(51) Int. Cl.
*H04L 12/28* (2006.01)
*H04L 12/56* (2006.01)
(Continued)

(52) U.S. Cl.
CPC ..................................... *H04W 40/08* (2013.01)
USPC ........... 370/389; 370/351; 709/238; 455/403; 455/422.1

(58) Field of Classification Search
CPC ..... H04L 45/122; H04L 45/426; H04L 45/66; H04L 45/12; H04L 45/20; H04L 45/02; H04L 45/70; H04L 45/22; H04L 45/10; H04L 45/00; H04L 45/26

USPC .............. 370/351, 389, 395.31, 395.32, 254, 370/310; 709/239, 242, 243, 238; 455/455, 455/422.1, 403
See application file for complete search history.

(56) References Cited

U.S. PATENT DOCUMENTS

| 6,044,062 A | 3/2000 | Brownrigg et al. |
| 2003/0188006 A1 | 10/2003 | Bard |

FOREIGN PATENT DOCUMENTS

| EP | 1 134 939 A1 | 9/2001 |
| WO | 99/04540 A1 | 1/1999 |

(Continued)

OTHER PUBLICATIONS

Johnson et al.; "DSR: the Dynamic source routing Protocol for Multi-Hop Wireless Ad Hoc Networks;" edited by Charles E. Perkins, Chapter 5; pp. 139-172; Addison-Wesley, 2001.*

(Continued)

*Primary Examiner* — Kwang B Yao
*Assistant Examiner* — Adam Duda
(74) *Attorney, Agent, or Firm* — Young & Thompson

(57) ABSTRACT

A method for optimizing data transfer in a wireless communication network is presented. A routing protocol is run for enabling data transmission devices (101-06) to form the wireless communication network. If routing information indicates that a route from a first data transmission device (101) to a second data transmission device (104) goes via at least one third data transmission (102, 103) device, it is checked whether a direct radio link (110) from the first data transmission device to the second data transmission device could be possible. If the direct radio link is possible, a message receivable by the at least one third data transmission device is sent. The message informs the third data transmission device that data transfer from the first data transmission device to the second data transmission device is direct radio communication and no forwarding actions are needed from the third data transmission device.

38 Claims, 7 Drawing Sheets

(51) Int. Cl.
*G06F 15/173* (2006.01)
*H04M 11/00* (2006.01)
*H04W 4/00* (2009.01)
*H04W 40/08* (2009.01)

(56) References Cited

FOREIGN PATENT DOCUMENTS

| WO | 02/23833 | A2 | 3/2002 |
| WO | 2009/064105 | A2 | 5/2009 |
| WO | 2009/084051 | A1 | 7/2009 |

OTHER PUBLICATIONS

Ogier, "RFC 3684: Topology Dissemination Based on Reverse-Path Forwarding (TBRPF)", Feb. 2004, IETF, all 46 pages.*
International Search Report, dated May 3, 2011, from corresponding PCT application.
Finnish Search Report, dated Aug. 31, 2010, from corresponding Finnish application.

* cited by examiner

METHOD AND A DEVICE FOR OPTIMIZING DATA TRANSFER IN A WIRELESS COMMUNICATION NETWORK

FIELD OF THE INVENTION

The present invention relates to a method for optimizing data transfer in a wireless communication network. Furthermore, the invention relates to a wireless communication network, to a data transmission device, and to a computer program for optimizing data transfer in a wireless communication network.

BACKGROUND

The configuration of dynamic wireless communication networks can be a challenging task because of inherent possibility for changes e.g. due to dynamic presence of wireless devices and their mobility. Therefore, the configuration maintenance easily arises to be even beyond the capabilities of human beings. Furthermore, wireless devices attached to a wireless communication network may have different capabilities for e.g. routing and forwarding of data traffic. Some devices may have a limited routing and forwarding capability because of e.g. limitations related to power consumption. On the other hand, some devices may be provided with a stronger power supply and these devices may be adapted to run services which require short data transmission delays, rapid reaction to route changes, high quality of service, and good security. Therefore, the characteristics of different parts of the wireless communication network may differ significantly from each other. This makes the routing and forwarding with a sufficient quality and reliability to be a challenging task. In many situations, the routes discovered using known methods may be too long and they may go via such devices that are not appropriate for acting as routers which provide a sufficient throughput and quality of service. This may make the end-to-end data transfer delays to be too long for services which require short data transmission delays.

There are multiple of routing protocols developed for dynamic wireless communication networks. These routing protocols are primarily developed for ad hoc wireless communication network which can be established without any previous configuration on the fly whenever required. Examples of these routing protocols are Topology Dissemination Based on Reverse-Path Forwarding (TBRPF), Ad-hoc On-Demand Distance Vector (AODV), and Routing Over Low power and Lossy networks (ROLL). However, the above described challenges related to routing and configuration and caused especially by the amount and heterogeneity of devices attached to a wireless communication network are not solved properly with the known technologies in all situations.

SUMMARY

In accordance with the first aspect of the present invention, there is provided a new method for optimizing data transfer in a wireless communication network comprising data transfer devices capable of wireless communication. The method according to the invention comprises:

running a routing protocol so as to enable a data transmission device to operate as a node of the wireless communication network,
checking, as a response to a situation in which routing information created or updated with the routing protocol indicates that data transfer from the data transmission device to a first other data transmission device is to be routed via at least one second other data transmission device, whether a direct radio link from the data transmission device to the first other data transmission device is possible,
sending, as a response to a situation in which the direct radio link is possible, a message which is receivable by the at least one second other data transmission device and which indicates that the data transfer from the data transmission device to the first other data transmission device is arranged to take place as direct radio communication from the data transmission device to the first other data transmission device, and
using, as a response to the situation in which the direct radio link is possible, the direct radio link for the data transfer from the data transmission device to the first other data transmission device.

The above-mentioned routing protocol can be, for example, Topology Dissemination Based on Reverse-Path Forwarding (TBRPF), Ad-hoc On-Demand Distance Vector (AODV), and Routing Over Low power and Lossy networks (ROLL), Internet (IP) routing protocol, or any other suitable routing protocol. The routing information created and updated with the routing protocol can be for example in the form of routing tables stored in the data transmission devices.

The above-described method makes possible a direct radio communication between the data transmission device and the first other data transmission device without a need for relaying actions taken by the one or more second other data transmission devices that are located on the route determined by the routing protocol. Hence, the radio communication between the data transmission device and the first other data transmission device can bypass the one or more second other data transmission devices. The method provides advantages for example in a situation in which one or more of the second other data transmission devices is/are not capable of satisfying the requirements related to communication between the data transmission device and the first other data transmission device, and it is possible to have the direct radio link between the data transmission device and the first other data transmission device. The data transmission device and the first other data transmission device represent to each other logical neighbours and the communication between them represents overlay communication with respect to the communication via the routes determined with the routing protocol.

In accordance with the second aspect of the present invention, there is provided a new wireless communication network. The wireless communication network according to the invention comprises:

two or more first data transmission devices for wireless communication, and
one or more second data transmission device for wireless communication,
wherein each of the first data transmission devices and each of the second data transmission devices are arranged to run a routing protocol so as to enable the first data transmission devices and the one or more second data transmission devices to operate as nodes of the wireless communication network, and at least one of the first data transmission devices is further arranged to:

check, as a response to a situation in which routing information created or updated with the routing protocol indicates that data transfer from this first data transmission device to another of the first data transmission devices is to be routed via at least one of the second data transmission devices, whether a direct radio link from this first data transmission device to the other first data transmission device is possible, send, as a response to a situation in which the direct radio link is possible, a message which is receivable by the at least one second other data transmission device and which indicates that the data transfer from this first data transmission device to the other first data transmission device is arranged to take place as direct radio communication from this first data transmission device to the other first data transmission device, and control, as a response to the situation in which the direct radio link is possible, this first data transmission device to use the direct radio link for data transmission from this first data transmission device to the other first data transmission device.

In accordance with the third aspect of the present invention, there is provided a new data transmission device. The data transmission device according to the invention comprises a data interface arranged to transmit and receive data, and a controller connected to the data interface and arranged to:

run a routing protocol so as to enable the data transmission device to operate as a node of a wireless communication network, check, as a response to a situation in which routing information created or updated with the routing protocol indicates that data transfer from the data transmission device to a first other data transmission device is to be routed via at least one second other data transmission device, whether a direct radio link from the data transmission device to the first other data transmission device is possible, and control, as a response to a situation in which the direct radio link is possible, the data transmission device to send a message which is receivable by the at least one second other data transmission device and which indicates that the data transfer from the data transmission device to the first other data transmission device is arranged to take place as direct radio communication from the data transmission device to the first other data transmission device.

In accordance with the fourth aspect of the present invention, there is provided a new computer program for optimizing data transfer in a wireless communication network. The computer program according to the invention comprises computer executable instructions for controlling a programmable processor of a data transmission device to:

check, as a response to a situation in which routing information created or updated with a routing protocol indicates that data transfer from the data transmission device to a first other data transmission device is to be routed via at least one second other data transmission device, whether a direct radio link from the data transmission device to the first other data transmission device is possible, and control, as a response to a situation in which the direct radio link is possible, the data transmission device to send a message which is receivable by the at least one second other data transmission device and which indicates that the data transfer from the data transmission device to the first other data transmission device is arranged to take place as direct radio communication from the data transmission device to the first other data transmission device.

A computer program product according to the invention comprises a computer readable medium, e.g. a compact disc (CD), encoded with a computer program according to the invention. Hence, the computer program product can be e.g. a compact disk that contains a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
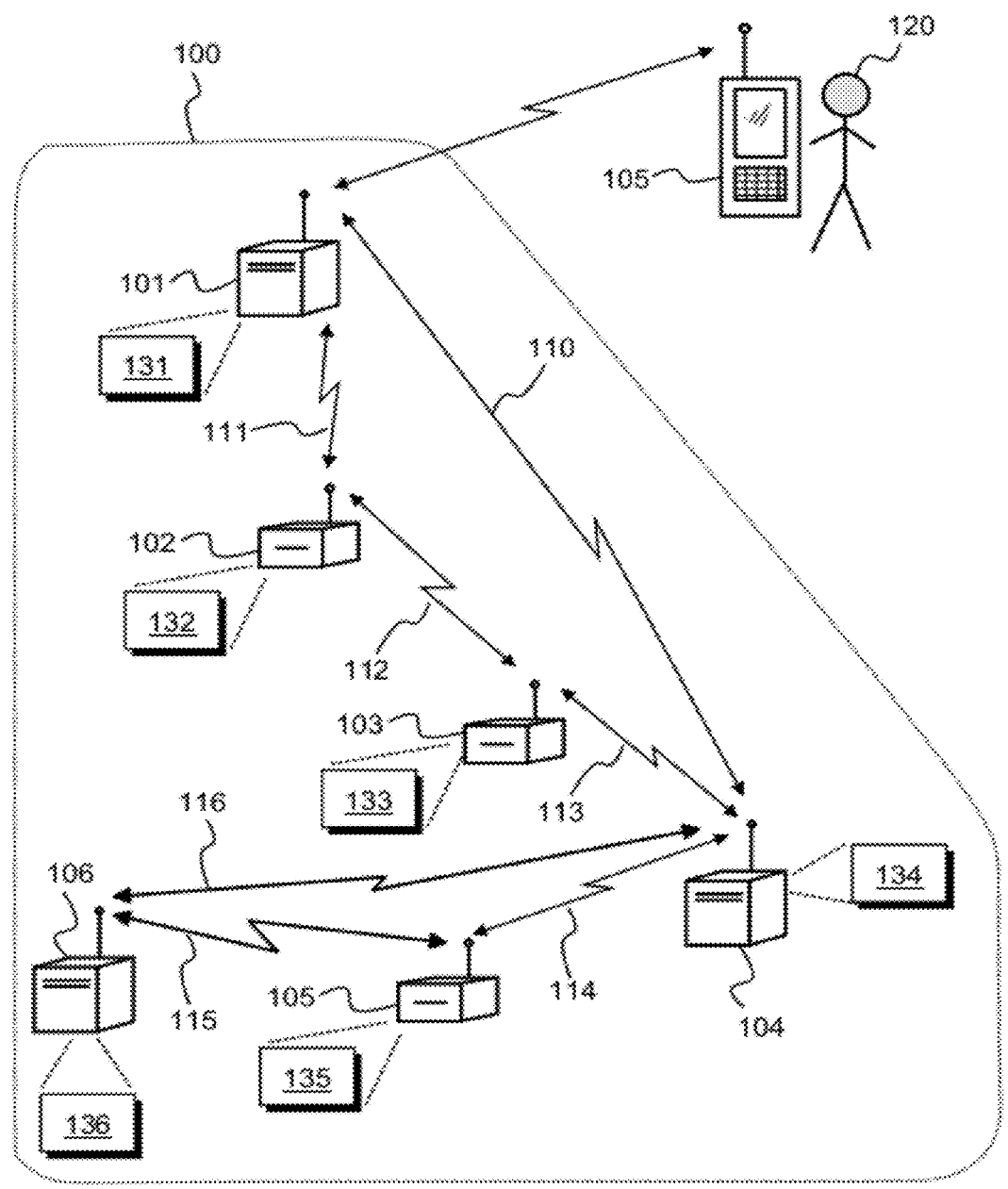
FIG. 1 shows a schematic illustration of an exemplifying wireless communication network according to an embodiment of the invention.

FIG. 1 shows a schematic illustration of a wireless communication network 100 according to an embodiment of the invention. The wireless communication network comprises first data transmission devices 101, 104, and 106 that comprise radio transceivers for wireless communication and second data transmission devices 102, 103, and 105 that also comprise radio transceivers for wireless communication. A user 120 is able to attach to the wireless communication network with a radio terminal device 105. It is also possible that any of the data transmission devices 101, 102, 103, 104, 105, and 106 is a user's device. In this exemplifying case we assume for illustrative purposes that the second data transmission devices 102, 103, and 105 have a limited routing and forwarding capability compared with those of the first data transmission devices 101, 104, and 106. The limitations of the routing and forwarding capabilities can caused by, for example, limitations related to power consumption and/or processing power. The first data transmission devices 101, 104, and 106 may be adapted to run services which require short data transmission delays, rapid reaction to route changes, high quality of service, and good security. Therefore, the characteristics of different parts of the wireless communication network 100 differ significantly from each other.

Each of the first data transmission devices 101, 104, and 106 and each of the second data transmission devices 102, 103, 105 is arranged to run a routing protocol so as to enable the first data transmission devices and the second data transmission devices to operate as nodes of the wireless communication network 100. Blocks 131, 132, 133, 134, 135, and 136 represent routing information, e.g. routing tables, created and/or updated by the routing protocol and stored in the data transmission devices 101-106. It is also possible that different routing protocols are used in different parts of the wireless communication network. For example, data transmission devices 104, 105, and 106 may run among themselves a first routing protocol, and data transmission devices 101, 102, 103, and 104 may run among themselves a second routing protocol. Therefore, the wireless communication network may consist of several parts, i.e. clusters, which may apply their own specific routing protocol. It is also possible to have a part or parts of the wireless communication network in which no routing protocol is needed. A routing protocol used in the wireless communication network can be, for example, Topology Dissemination Based on Reverse-Path Forwarding (TBRPF), Ad-hoc On-Demand Distance Vector (AODV), Routing Over Low power and Lossy networks (ROLL), or an IP (Internet Protocol) routing protocol such as RIP (Routing Information Protocol) or OSPF (Open Shortest Path First). The data transmission devices 101-106 are interconnected with radio links 111, 112, 113, 114, and 115. These radio links may use a same radio protocol or different radio links may use different radio protocols. A radio link of the wireless communication network can be, for example, a Bluetooth® radio link or a radio link according to WLAN-radio protocol (Wireless Local Area Network). The operation of the one or more radio protocols constitutes a networking hierarchy level that provides service for an upper networking hierarchy level constituted by the operation of the one or more above-mentioned routing protocols.

Each of the first data transmission devices 101, 104, and 106 is arranged to check, whether a direct radio link from this first data transmission device to another first data transmission device could be possible, when the routing information indicates that data transfer from this first data transmission device to the other of the first data transmission devices is to be routed via at least one of the second data transmission devices 102, 103 and 105. This first data transmission device is arranged to send, as a response to a situation in which the direct radio link is possible, a message receivable by the at least one second other data transmission device and indicating that the data transfer from this first data transmission device to the other first data transmission device is arranged to take place as direct radio communication from this first data transmission device to the other first data transmission device. For example, in the exemplifying situation shown in FIG. 1, the routing information 131 indicates that data transfer from the data transmission device 101 to the data transmission device 104 is to be routed via at least one other data transmission device. In this particular case, the route goes via the data transmission devices 102 and 103. Therefore, the data transmission device 101 checks whether a direct radio link 110 from the data transmission device 101 to the data transmission device 104 is possible. If the direct radio link is possible, the data transmission device 101 sends a message that is receivable by the data transmission devices 102 and 103. The message informs the data transmission devices 102 and 103 that data transfer from the data transmission device 101 to the data transmission device 104 is direct radio communication and, concerning this data transfer, no forwarding actions are needed from the data transmission devices 102 and 103. As a response to receiving the message the data transmission devices 102 and 103 may, for example, remove the routes between the data transmission devices 101 and 104 from their routing information, e.g. routing tables, or configure access control lists (ACL) or other information to indicate that no forwarding actions are needed for data transfer from the data transmission device 101 to the data transmission device 104. The routing information 131 also indicates that data transfer from the data transmission device 101 to the data transmission device 106 is to be routed via at least one other data transmission device. In this exemplifying case it is assumed that a direct radio link between the data transmission device 101 and the data transmission device 106 is not possible. It is assumed that a direct radio link from the data transmission device 104 to the data transmission device 101 is possible and direct radio links 116 between the data transmission device 104 and the data transmission device 106 are possible. The following advantages are achieved with the direct radio links: end-to-end delays can be smaller, routes can be shorter, computing resources can be saved, and ubiquitous communication of dynamic machine-to-machine systems can be enabled.

It should be noted that, in a general case, a single directional radio link can be possible in a situation where a bidirectional radio link is not possible. This kind a situation can arise when one end can use a higher radio transmission power than the other end. If, for example, the direct radio link from the data transmission device 104 to the data transmission device 106 were possible but the direct radio link in the opposite direction, i.e. from the data transmission device 106 to the data transmission device 104, were not possible, the data transfer from the data transmission device 104 to the data transmission device 106 would go though the direct radio link but the data transfer in the opposite direction would be relayed by the data transmission device 105.

The first data transmission devices 101, 104, and 106 that are interconnected with the direct radio links 110 and 116 form an overlay communication level that lies on the wireless communication network 100 and utilises, for its configuration, the routing information provided by the one or more routing protocols. Therefore, the networking hierarchy level constituted by the operation of the one or more routing protocols can be seen to serve an upper logical hierarchy level constituted by the first data transmission devices 101, 104, and 106 and the direct radio links between them. Hence, there can be three levels of hierarchy. The operation of the one or more radio protocols constitutes the lowest hierarchy level that serves the upper hierarchy level constituted by the operation of the one or more routing protocols which, in turn, serves the still upper hierarchy level constituted by the first data transmission devices 101, 104, and 106 and the direct radio links 110 and 116.

Figure 2:
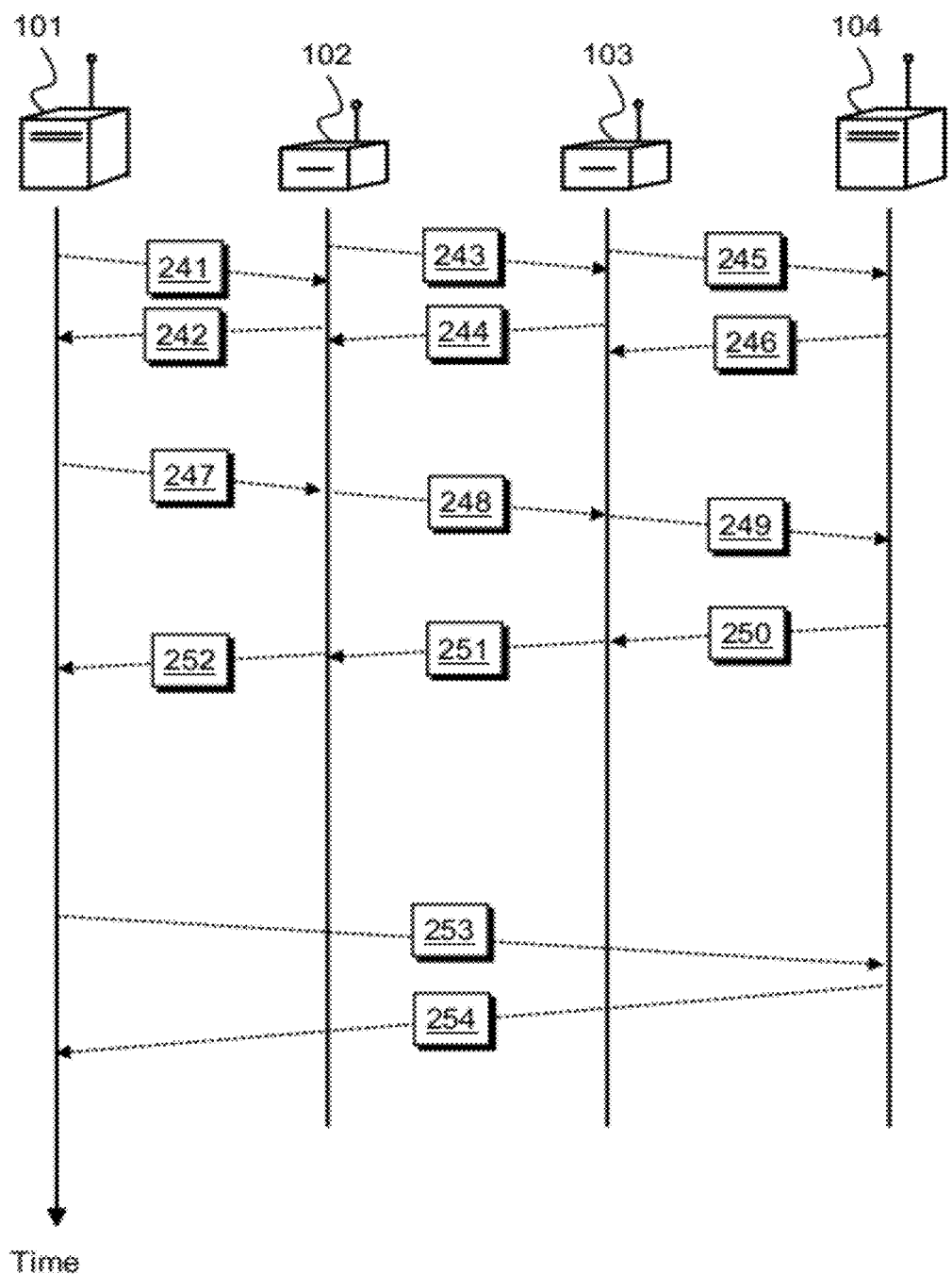
FIG. 2 shows an exemplifying signal diagram that illustrates operation of a routing protocol in the wireless communication network shown in FIG. 1.
Figure 3:
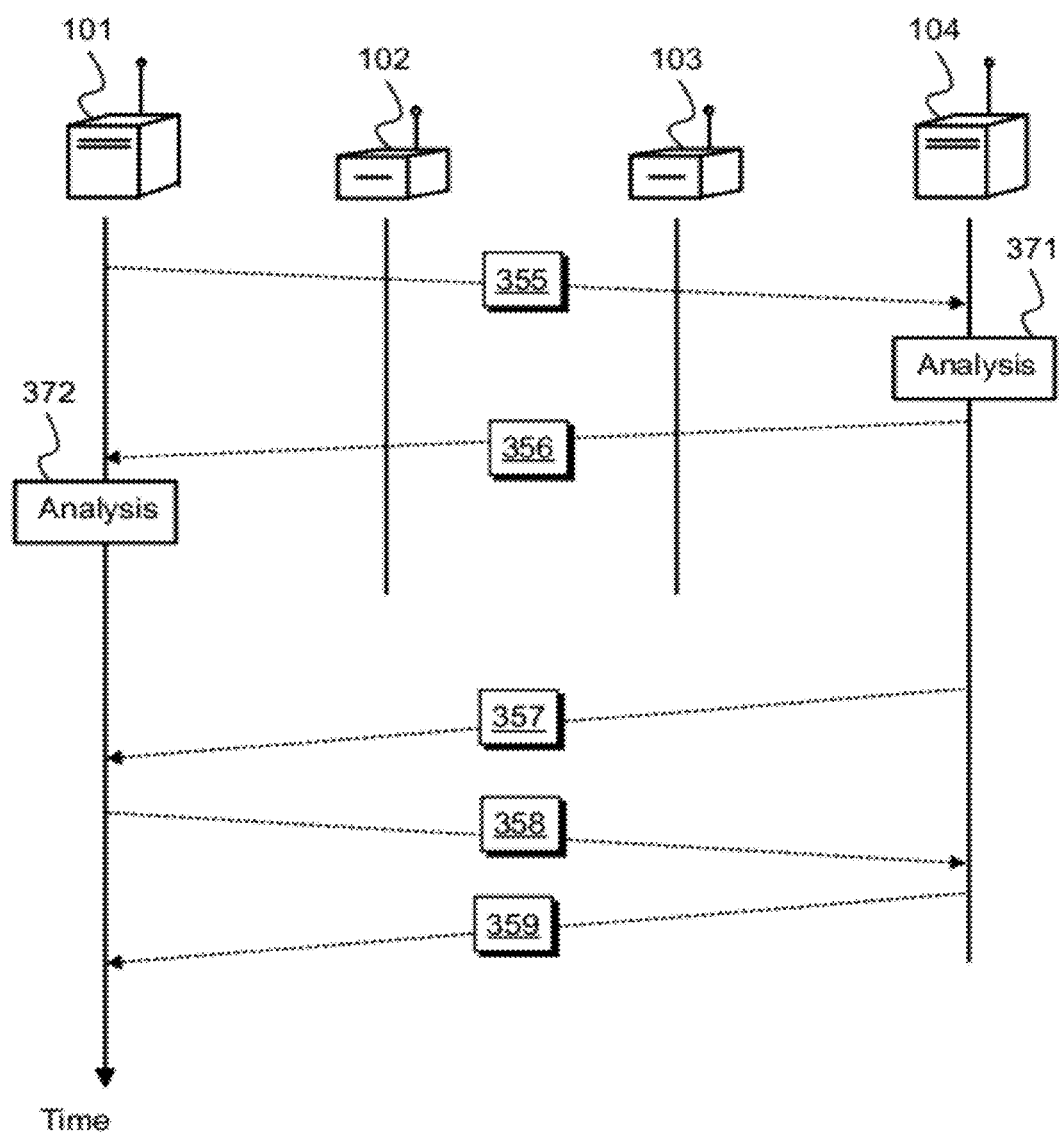
FIG. 3 shows an signal diagram that illustrates an exemplifying way of checking whether a direct radio link is possible between data transmission devices in the wireless communication network shown in FIG. 1, FIGS. 4 and 5 illustrate exemplifying forwarding operations in the wireless communication network shown in FIG. 1.

FIG. 2 shows an exemplifying signal diagram that illustrates operation of a routing protocol between the data transmission devices 101-104 in the wireless communication network 100 shown in FIG. 1. FIG. 3 shows a signal diagram that illustrates an exemplifying way of checking whether a direct radio link is possible between the data transmission devices 101 and 104. FIG. 2 illustrates a part of a hierarchical neighbor discovery process. In the process, each data transmission device of the overlay communication level, i.e. each first data transmission device 101, 104, 106, searches its logical neighbors, i.e. other first data transmission devices, available in its neighborhood. The term "logical neighbor" means a neighbor in the overlay communication level. Information indicating whether a certain data transmission device belongs to the first data transmission devices, i.e. to the overlay communication level, or to the second data transmission devices, i.e. not to the overlay communication level, can be indicated for example with a parameter stored at each data transmission device.

Messages 241 and 242 shown in FIG. 2 represent advertizing messages related to the routing protocol run between the data transmission devices 101 and 102. Correspondingly, messages 243 and 244 represent advertizing messages related to the routing protocol run between the data transmission devices 102 and 103, and messages 245 and 246 represent advertizing messages related to the routing protocol run between the data transmission devices 103 and 104. The above-mentioned messages are related to physical neighbor discovery processes according to the one or more applied routing protocols, e.g. IP, AODV, TBRPF, ROLL etc. The messages 241-246 can be for example AODV-Hello messages. Messages 247, 248, 249, 250, 251, and 252 relate to the creation of the routing information e.g. the creation of the routing tables. The messages 247-252 can be e.g. requests and responses according to the one or more routing protocols being used, e.g. IP, AODV, TBRPF, ROLL etc. The messages 247, 248, and 249 can be for example AODV-RouteRequest messages, and the messages 250, 251, and 252 can be for example AODV-RouteReply messages. The messages 247-249 contain information indicating that the data transmission device 101 is searching its logical neighbors, i.e. other first data transmission devices in its neighborhood. The messages 250-252 contain the address of the data transmission device 104 and information indicating that the data transmission device 104 belongs to the overlay communication level. The data transmission device 104 is configured to know that it belongs to the overlay communication level and thus it provides the reply message 250 with its address and also with the information indicating that the data transmission device 104 belongs to the overlay communication level. The result of the above process is that there are valid physical routes between the data transmission devices 101 and 104, and that the data transmission devices 101 and 104 know that they are neighbors of each other in the overlay communication level. Similar processes take place between the data transmission devices 101 and 106, and between the data transmission devices 104 and 106.

The overlay neighbor discovery process is started by the sending from the data transmission device 101 a NeighborHelloReq message 253 to the data transmission device 104. The message 253 is addressed to the data transmission device 104 and the message 253 is routed to the data transmission device 104 via the data transmission devices 102 and 103. The NeighborHelloReq message 253 is an upper layer payload for the data transmission devices 102 and 103 and the data transmission devices 102 and 103 only forward the message 253 towards the data transmission device 104. A need to transmit the NeighborHelloReq message 253 may trigger the above-described process that uses the messages 247-252 for constructing a valid physical route to the data transmission device 104. The physical route is then applied to transfer the NeighborHelloReq message 253 to the data transmission device 104 which creates NeighborHelloRsp 254 messages as a response. The result of the transfer of the messages 253 and 254 is that the data transmission devices 101 and 104 are provided with configuration data for the purpose of communication in the overlay communication level, i.e. the communication between the data transmission devices 101 and 104. The configuration data may comprise, for example, encryption parameters and addresses of the data transmission devices 101 and 104 in the format used in the overlay communication level. Similar processes take place between the data transmission devices 101 and 106 and between the data transmission devices 104 and 106. In practical implementations, it may be advantageous to construct routing information that is dedicated for the overlay communication level. For example, there can be dedicated routing tables for the overlay communication level. This is especially advantageous if the wireless communication network comprises parts where different routing protocols, which are not necessarily capable of communicating with each other, are being used. The routing information dedicated for the overlay communication level can be constructed with the aid of the messages 253 and 254 and with the aid of corresponding messages between the data transmission devices 101 and 106 and between the data transmission devices 104 and 106. Furthermore, it is possible that endpoints of logical pipes for communication between the data transmission devices of the overlay communication level are included in the routing information, e.g. routing tables, dedicated for the overlay communication level.

An exemplifying process for checking whether a bidirectional direct radio link is possible between the data transmission devices 101 and 104 is visualized in FIG. 3. Using this process the data transmission devices 101, 104, and 106 can try to create direct radio links, i.e. wireless short-cuts, between each others, and thus to bypass all the data transmission devices 102, 103, and/or 105 which otherwise would locate between the data transmission devices 101, 104, and/or 106. The data transmission devices 101, 104, and 106 may establish direct radio links, if the distance between them is not too long and free enough from obstacles. The direct radio link between the data transmission devices 101 and 104 is established in a controlled way using the messages described in FIG. 3. A ShortCutControlReq message 355 is sent from the data transmission device 101 to the data transmission device 104. The message 355 is relayed by the data transmission devices 102 and 103 according to the routing information. A least partly on the basis of the message 355, the data transmission device 104 analyses 371 whether or not a direct radio link from the data transmission device 104 to the data transmission device 101 is possible. A ShortCutControlResp message 356 is sent from the data transmission device 104 to the data transmission device 101. Also the message 356 can be relayed by the data transmission devices 103 and 104 according to the routing information. At least partly on the basis of the message 356, the data transmission device 101 analyses 372 whether or not a direct radio link from the data transmission device 101 to the data transmission device 104 is possible. The analyses 371 and 372 may be based on e.g. calculation of distance between the data transmission device 104 and the data transmission device 101 and on the maximum useable radio transmission powers of the data transmission devices 101 and 104. The data transmission devices 101 and 104 may be equipped with GPS (Global Positioning System) receivers, and the messages 355 and 356 may contain the location co-ordinates of the data transmission devices 101 and 104, respectively. A ShortCutControlAck message 357 is send from the data transmission device 104 to the data transmission device 101. The message 357 indicates that the data transmission device 104 starts to use the direct radio link if the data transmission device 101 replies with a ShortCutControlCnf message 358. The messages 357 and 358 are sent trough the direct radio link, i.e. without relaying by the data transmission devices 102 and 103. It is possible to have a further message 359 that informs the data transmission device 101 that the data transmission device 104 has successfully received the message 358. The message 359 completes a three-way handshake over the direct radio links. The data transmission devices 102 and 103 can be arranged to be able to receive the messages 357-359 and thus become aware that they are wanted to interfere with the data transfer between the data transmission devices 101 and 104.

In another exemplifying process for checking whether a direct radio link is possible between the data transmission devices 101 and 104, the data transmission devices 101 and 104 are arranged to send tests messages to each other and to deem the direct radio link to be possible as a response to a situation in which reply messages to the test messages are received. The test message sent by the data transmission device 101 is preferably provided with a data item that forbids all data transmission devices from relaying it and all other data transmission devices, than the data transmission device 104, from replying it. Correspondingly, the test message sent by the data transmission device 104 is preferably provided with a data item that forbids all data transmission device from relaying it and all other data transmission devices, than the data transmission device 101, from replying it.

The data transmission devices 101 and 104 are preferably arranged to use higher radio transmission power for the direct radio communication through the direct radio link than for communication that is relayed by the data transmission devices 102 and 103. Regarding to FIGS. 2 and 3 this means that the messages 357-359 are transmitted with higher radio transmission power than messages 241-254, 355, and 356.

Figure 4:
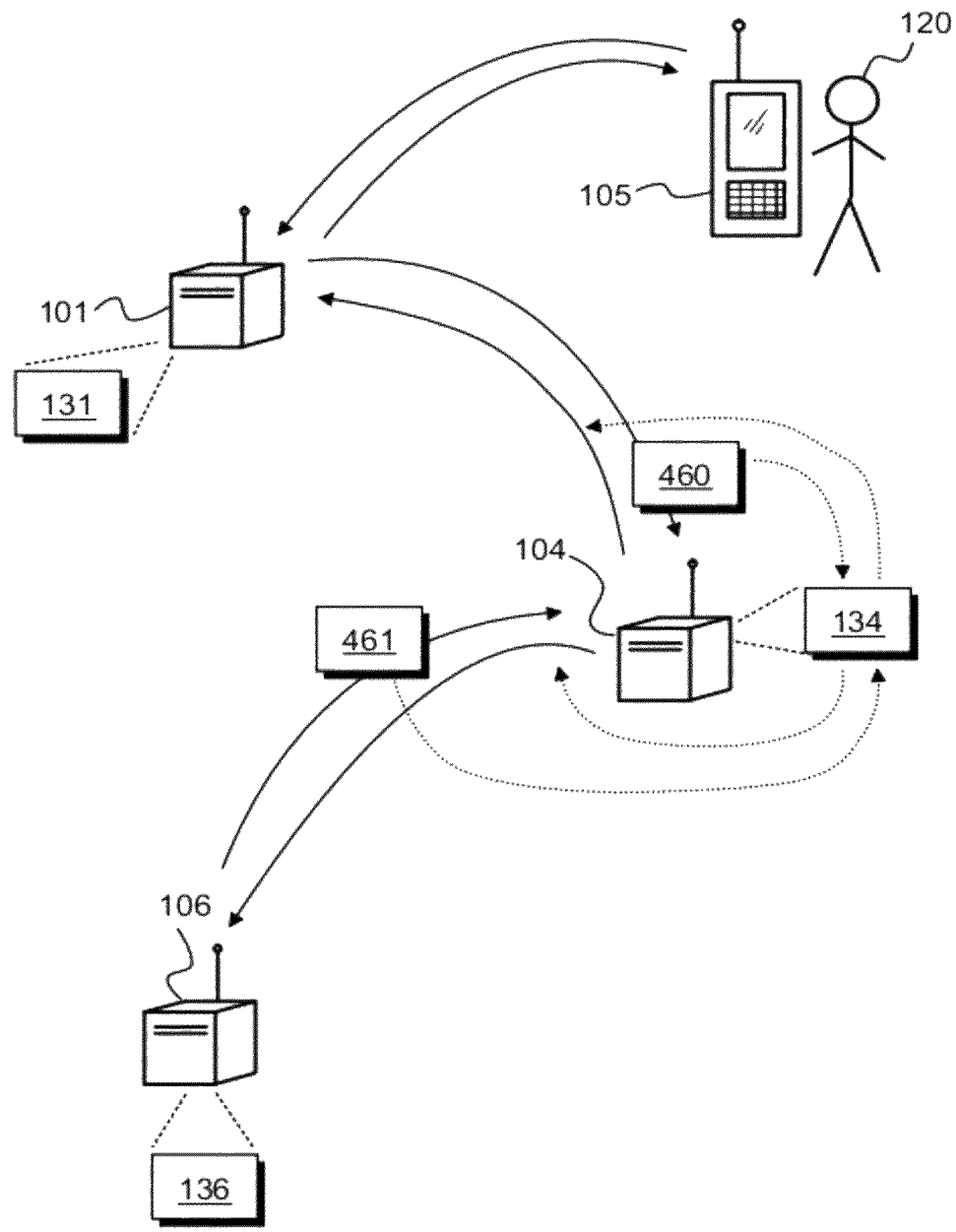
Figure 5:
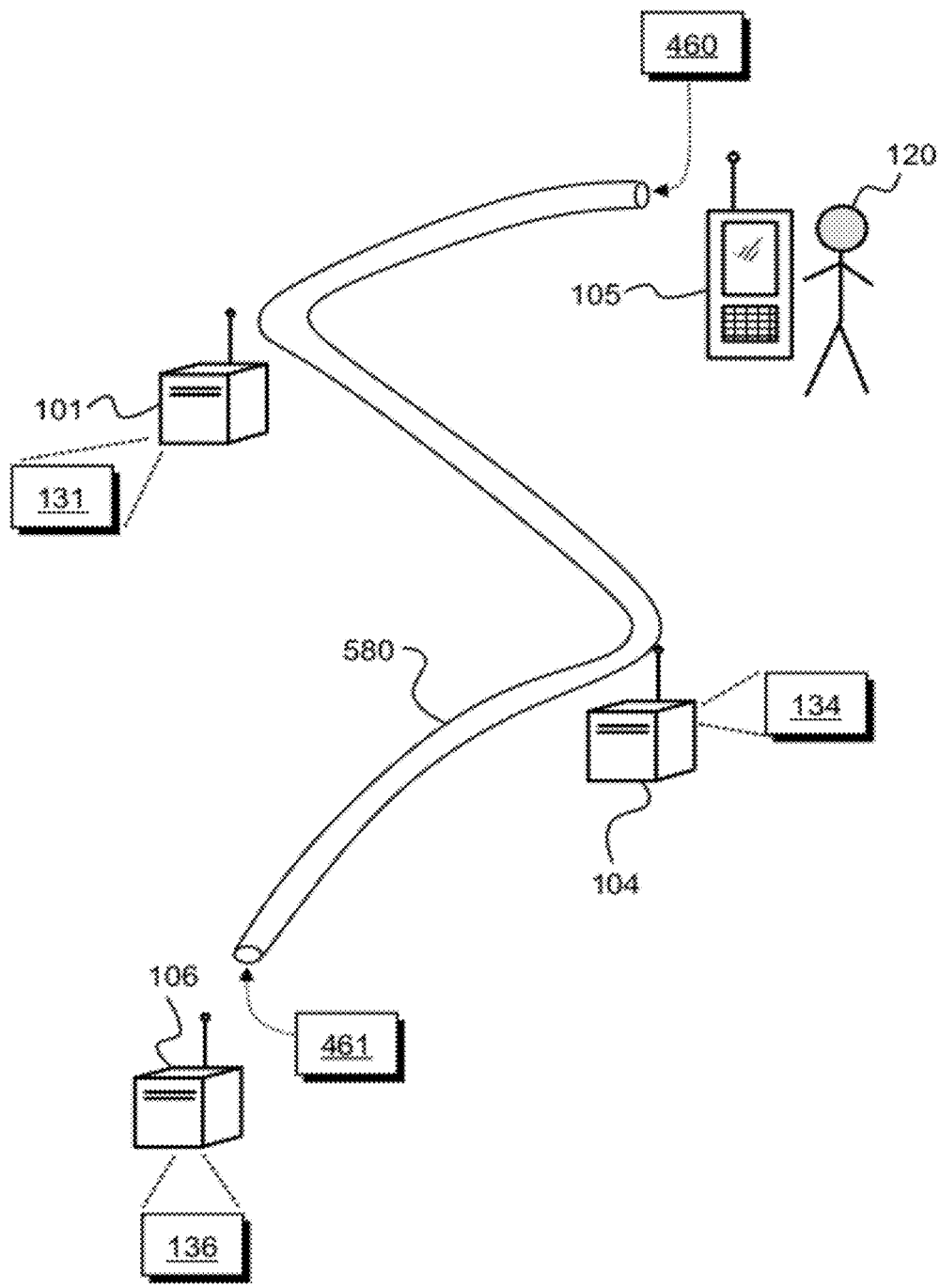

FIGS. 4 and 5 illustrate exemplifying forwarding operations in the wireless communication network shown in FIG. 1. In the exemplifying situations shown in FIGS. 4 and 5, a message 460 is transferred from the data transmission device 105 to the data transmission device 106, and a message 461 is transferred from the data transmission device 106 to the data transmission device 105. FIG. 4 illustrates connectionless data transfer in which messages 460 and 461 are forwarded on the hop-by-hop basis in each of the data transmission devices 101 and 102 on the basis of address data contained by the messages and the routing information 131 and 134. FIG. 5 illustrates connection oriented data transfer in which there is logical pipe 580 that has been defined earlier than data transfer between data transfer devices 105 and 106 takes place. The hop-by-hop forwarding illustrated in FIG. 4 as well as the logical pipe illustrated in FIG. 5 utilise the direct radio links established between the data transmission devices 101, 104, and 106.

The data transfer illustrated in FIGS. 4 and 5 can be made secure using suitable methods. For example, the method presented in the European patent application 07106581.7 can be applied to verify the reliability of the appropriate data transmission devices. Another possibility is to use a shared network key among all the data transmission devices or using each data transmission device's own public key with asymmetric encryption for device-to-device communication.

Figure 6:
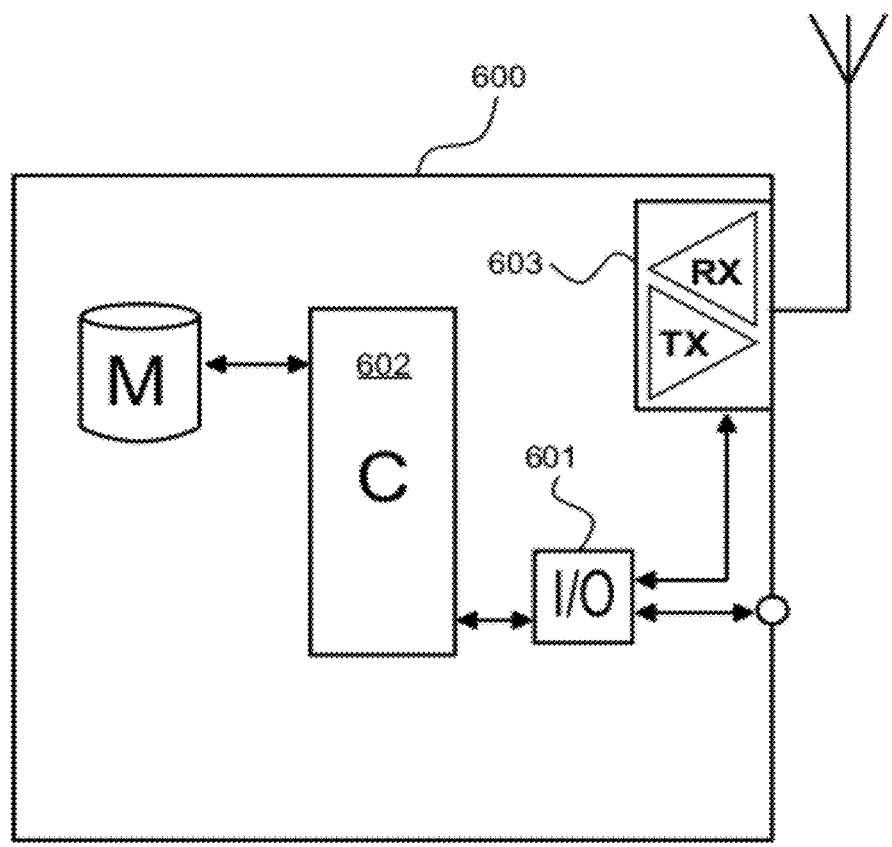
FIG. 6 shows a block diagram of a data transmission device according to an embodiment of the invention.

FIG. 6 shows a block diagram of a data transmission device 600 according to an embodiment of the invention. The data transmission device comprises a data interface 601 arranged to transmit and receive data and a controller 602 connected to the data interface and arranged to:
- run a routing protocol so as to enable the data transmission device to operate as a node of a wireless communication network,
- check, as a response to a situation in which routing information created or updated with the routing protocol indicates that data transfer from the data transmission device to a first other data transmission device is to be routed via at least one second other data transmission device, whether a direct radio link from the data transmission device to the first other data transmission device is possible, and
- control, as a response to a situation in which the direct radio link is possible, the data transmission device to send a message receivable by the at least one second other data transmission device and indicating that the data transfer from the data transmission device to the first other data transmission device is arranged to take place as direct radio communication from the data transmission device to the first other data transmission device.

The data transmission device may further comprise a radio transceiver 603 connected to the data interface 601. The radio transceiver can be arranged to support the Bluetooth® radio protocol and/or a WLAN-radio protocol (Wireless Local Area Network). It is also possible that the data interface 601 is capable of being connected to an external radio transceiver. The controller 602 may be arranged to control, as a response to the situation in which the direct radio link is possible, the data transmission device to use the direct radio link for data transfer from the data transmission device to the first other data transmission device. Alternatively, this control action may be carried out by an external device connected to the data transmission device.

The controller 602 may comprise one or more processing units and each processing unit can be a programmable processor, a dedicated circuit, e.g. an ASIC (Application Specific Integrated Circuit), or a configurable circuit, e.g. an FPGA (Field Programmable Gate Array).

In a data transmission device according to an embodiment of the invention, the controller 602 is arranged to control the data transmission device to transmit, prior to checking whether the direct radio link is possible, to the first other data transmission device first configuration data usable for the purpose of the direct radio communication, and to use second configuration data received from the first other data transmission device for the direct radio communication. The first and second configuration data are routed via the at least one second other data transmission device. For example, the messages 253 and 254 shown in FIG. 2 may represent the first and second configuration data.

In a data transmission device according to an embodiment of the invention, the controller 602 is arranged to use the direct radio link as a part of one or more connection oriented data transfer paths configured with the routing protocol into the wireless communication network.

In a data transmission device according to an embodiment of the invention, the controller 602 is arranged to use the direct radio link as a single hop in connectionless communication.

In a data transmission device according to an embodiment of the invention, the controller 602 is arranged to support encryption of data transferred through the one or more connection oriented data transfer paths.

In a data transmission device according to an embodiment of the invention, the controller 602 is arranged to support encryption of data transferred through the direct radio link.

In a data transmission device according to an embodiment of the invention, the controller 602 is arranged to address the message to the at least one second other data transmission device.

In a data transmission device according to an embodiment of the invention, the controller 602 is arranged to send the message as a part of data transferred through the direct radio link to the first other data transmission device, the at least one second other data transmission device being able to receive the data transferred through the direct radio link.

In a data transmission device according to an embodiment of the invention, the controller 602 is arranged to run a neighbour discovery process of the routing protocol at predetermined time instants so as to update the routing information.

In a data transmission device according to an embodiment of the invention, the controller 602 is arranged to run a neighbour discovery process of the routing protocol as a response to a need to transfer data from the data transmission device to the first other data transmission device so as to create or update the routing information.

In a data transmission device according to an embodiment of the invention, the controller 602 is arranged to run a neighbour discovery process of the routing protocol as a response to an indication of a change in the wireless communication network so as to create or update the routing information. The indication of the change can be for example a received message indicating that a new data transmission device has entered the wireless communication network, or a received message indicating that a certain data transmission device is leaving the wireless communication network, or a situation in which a pre-determined time has elapsed after reception of a last message indicating reachability of a certain data transmission device.

In a data transmission device according to an embodiment of the invention, the controller 602 is arranged to form an estimate of the distance from the data transmission device to the first other data transmission device on the basis of location co-ordinates of the data transmission device and the first other data transmission device, and to deem the direct radio link to be possible when the distance is below a pre-determined limit value.

In a data transmission device according to an embodiment of the invention, the controller 602 is arranged to send a test message and to deem the direct radio link to be possible as a response to a situation in which a reply message to the test message is received from the first other data transmission device.

In a data transmission device according to an embodiment of the invention, the controller 602 is arranged to support at least one of the following routing protocols: Topology Dissemination Based on Reverse-Path Forwarding (TBRPF), Ad-hoc On-Demand Distance Vector (AODV), Routing Over Low power and Lossy networks (ROLL).

In a data transmission device according to an embodiment of the invention, the controller 602 is arranged to control a radio transmitter to use higher radio transmission power for the direct radio communication from the data transmission device to the first other data transmission device than for communication from the data transmission device to the first other data transmission device taking place via the at least one second other data transmission device.

Figure 7:
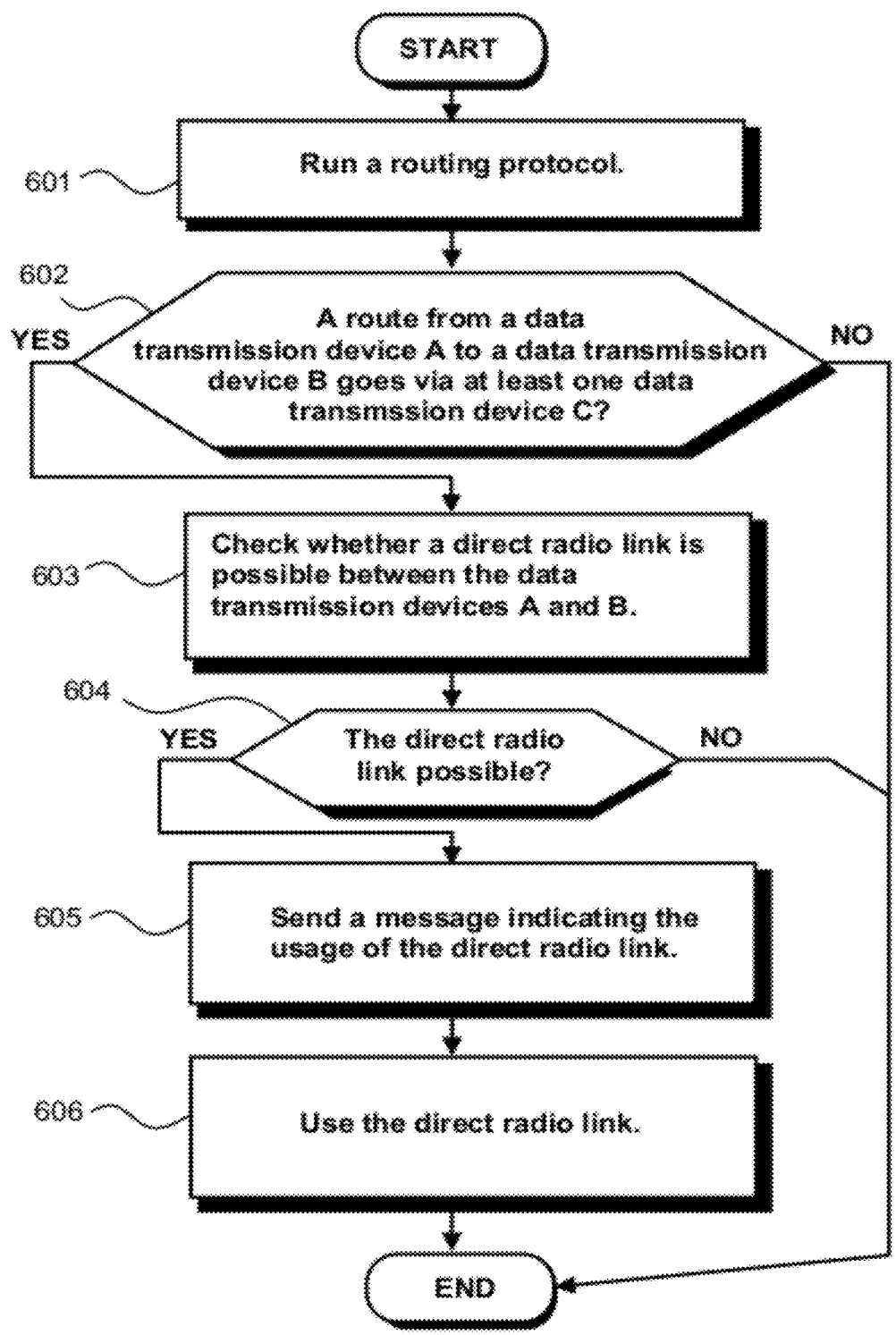
FIG. 7 shows a flow chart of a method according to an embodiment of the invention for for optimizing data transfer in a wireless communication network.

FIG. 7 shows a flow chart of a method according to an embodiment of the invention for for optimizing data transfer in a wireless communication network. The method comprises:

running, action 601, a routing protocol so as to enable a data transmission device to operate as a node of the wireless communication network, checking, action 603, as a response to a situation 602 in which routing information created or updated with the routing protocol indicates that data transfer from the data transmission device to a first other data transmission device is to be routed via at least one second other data transmission device, whether a direct radio link from the data transmission device to the first other data transmission device is possible, sending, action 605, as a response to a situation 604 in which the direct radio link is possible, a message receivable by the at least one second other data transmission device and indicating that the data transfer from the data transmission device to the first other data transmission device is arranged to take place as direct radio communication from the data transmission device to the first other data transmission device, and using, action 606, as a response to the situation in which the direct radio link is possible, the direct radio link for the data transfer from the data transmission device to the first other data transmission device.

A method according an embodiment of the invention further comprises transmitting, prior to checking whether the direct radio link is possible, from the data transmission device to the first other data transmission device first configuration data usable for the purpose of the direct radio communication, and using at the data transmission device second configuration data received from the first other data transmission device for the direct radio communication, the first and second configuration data being routed via the at least one second other data transmission device.

In a method according to an embodiment of the invention, the direct radio link is used as a part of one or more connection oriented data transfer paths configured with the routing protocol into the wireless communication network.

In a method according to an embodiment of the invention, the direct radio link is used as a single hop in connectionless communication.

A method according an embodiment of the invention comprises encryption of data transferred through the one or more connection oriented data transfer paths.

A method according an embodiment of the invention comprises encryption of data transferred through the direct radio link.

In a method according to an embodiment of the invention, the message indicating that the data transfer from the data transmission device to the first other data transmission device is arranged to take place as direct radio communication is addressed to the at least one second other data transmission device.

In a method according to an embodiment of the invention, the above-mentioned message is a part of data transferred through the direct radio link to the first other data transmission device, the at least one second other data transmission device being able to receive the data transferred through the direct radio link.

In a method according to an embodiment of the invention, a neighbour discovery process of the routing protocol is run at predetermined time instants so as to update the routing information.

In a method according to an embodiment of the invention, a neighbour discovery process of the routing protocol is run as a response to a need to transfer data from the data transmission device to the first other data transmission device so as to create or update the routing information.

In a method according to an embodiment of the invention, a neighbour discovery process of the routing protocol is run as a response to an indication of a change in the wireless communication network so as to create or update the routing information.

In a method according to an embodiment of the invention, an estimate of the distance from the data transmission device to the first other data transmission device is formed on the basis of location co-ordinates of the data transmission device and the first other data transmission device. The direct radio link is deemed to be possible when the distance is below a pre-determined limit value.

In a method according to an embodiment of the invention, a test message is sent and the direct radio link is deemed to be possible as a response to a situation in which a reply message to the test message is received from the first other data transmission device.

In a method according to an embodiment of the invention, at least one of the following is used as the routing protocol: Topology Dissemination Based on Reverse-Path Forwarding (TBRPF), Ad-hoc ON-Demand Distance Vector (AODV), Routing Over Low power and Lossy networks (ROLL).

In a method according to an embodiment of the invention, at least one of the following is used for the direct radio communication from the data transmission device to the first other data transmission device: Bluetooth® radio protocol, a WLAN-radio protocol (Wireless Local Area Network).

In a method according to an embodiment of the invention, higher radio transmission power is used for the direct radio communication from the data transmission device to the first other data transmission device than for communication from the data transmission device to the first other data transmission device taking place via the at least one second other data transmission device.

A computer program according to an embodiment of the invention comprises programmatic means for optimizing data transfer in a wireless communication network. The programmatic means comprise computer executable instructions for controlling a programmable processor of a data transmission device to:

check, as a response to a situation in which routing information created or updated with a routing protocol indicates that data transfer from the data transmission device to a first other data transmission device is to be routed via at least one second other data transmission device, whether a direct radio link from the data transmission device to the first other data transmission device is possible, and control, as a response to a situation in which the direct radio link is possible, the data transmission device to send a message receivable by the at least one second other data transmission device and indicating that the data transfer from the data transmission device to the first other data transmission device is arranged to take place as direct radio communication from the data transmission device to the first other data transmission device.

The computer executable instructions can be e.g. subroutines and/or functions.

A computer program product according to an embodiment of the invention comprises a computer readable medium, e.g. a compact disc (CD) or a random access memory device (RAM), encoded with a computer program according to an embodiment of the invention.

A computer program product according to an embodiment of the invention is a signal that is receivable from a communication network and is encoded with a computer program according to an embodiment of the invention.

The specific examples provided in the description given above should not be construed as limiting. Therefore, the invention is not limited merely to the embodiments described above, many variants being possible.

What is claimed is:

1. A data transmission device (600) comprising:
a data interface (601) arranged to transmit and receive data, and
a controller (602) connected to the data interface and arranged to run a routing protocol so as to enable the data transmission device to operate as a node of a wireless communication network,
wherein the controller is further arranged to:
check, as a response to a situation in which routing information created or updated with the routing protocol indicates that data transfer from the data transmission device to a first other data transmission device is to be routed via at least one second other data transmission device, whether a direct radio link from the data transmission device to the first other data transmission device is possible, and
control, as a response to a situation in which the direct radio link is possible, the data transmission device to send a message which is addressed to the at least one second other data transmission device and which informs the at least one second other data transmission device that the data transfer from the data transmission device to the first other data transmission device is arranged to take place as direct radio communication from the data transmission device to the first other data transmission device.

2. The data transmission device according to claim 1, wherein the controller is arranged to control the data transmission device to transmit, prior to checking whether the direct radio link is possible, to the first other data transmission device first configuration data usable for the direct radio communication, and to use second configuration data received from the first other data transmission device for the direct radio communication, the first and second configuration data being routed via the at least one second other data transmission device.

3. The data transmission device according claim 2, wherein the controller is arranged to support encryption of data transferred through the one or more connection oriented data transfer paths.

4. The data transmission device according to claim 1, wherein the controller is arranged to use the direct radio link as a part of one or more connection oriented data transfer paths configured with the routing protocol into the wireless communication network.

5. The data transmission device according to claim 4, wherein the controller is arranged to support encryption of data transferred through the direct radio link.

6. The data transmission device according to claim 1, wherein the controller is arranged to use the direct radio link as a single hop in connectionless communication.

7. The data transmission device according to claim 1, wherein the controller is arranged to address the message to the at least one second other data transmission device.

8. The data transmission device according to claim 1, wherein the controller is arranged to send the message as a part of data transferred through the direct radio link to the first other data transmission device, the at least one second other data transmission device being able to receive the data transferred through the direct radio link.

9. The data transmission device according to claim 1, wherein the controller is arranged to run a neighbour discovery process of the routing protocol at predetermined time instants so as to update the routing information.

10. The data transmission device according to claim 1, wherein the controller is arranged to run a neighbour discovery process of the routing protocol as a response to a need to transfer data from the data transmission device to the first other data transmission device so as to create or update the routing information.

11. The data transmission device according to claim 1, wherein the controller is arranged to run a neighbour discovery process of the routing protocol as a response to an indication of a change in the wireless communication network so as to create or update the routing information.

12. The data transmission device according to claim 1, wherein the controller is arranged to form an estimate of a distance from the data transmission device to the first other data transmission device based on location coordinates of the data transmission device and the first other data transmission device, and to deem the direct radio link to be possible when the distance is below a pre-determined limit value.

13. The data transmission device according to claim 1, wherein the controller is arranged to send a test message and to deem the direct radio link to be possible as a response to a situation in which a reply message to the test message is received from the first other data transmission device.

14. The data transmission device according to claim 1, wherein the controller is arranged to support at least one of the following routing protocols: Topology Dissemination Based on Reverse-Path Forwarding (TBRPF), Ad-hoc On-Demand Distance Vector (AODV), Routing Over Low power and Lossy networks (ROLL).

15. The data transmission device according to claim 1, wherein the data transmission device comprises a radio transceiver (603) connected to the data interface.

16. The data transmission device according to claim 15, wherein the radio transceiver is arranged to support at least one of the following: Bluetooth® radio protocol, a WLAN-radio protocol (Wireless Local Area Network).

17. The data transmission device according to claim 1, wherein the data interface is capable of being connected to an external radio transceiver.

18. The data transmission device according to claim 1, wherein the controller is arranged to control a radio transmitter to use higher radio transmission power for the direct radio communication from the data transmission device to the first other data transmission device than for communication from the data transmission device to the first other data transmission device taking place via the at least one second other data transmission device.

19. A method for optimizing data transfer in a wireless communication network, the method comprising carrying out the following actions in a data transmission device of the wireless communication network:
  running (601), by the data transmission device, a routing protocol so as to enable a data transmission device to operate as a node of the wireless communication network,
  checking (603), by the data transmission device and as a response to a situation (602) in which routing information created or updated with the routing protocol indicates that data transfer from the data transmission device to a first other data transmission device is to be routed via at least one second other data transmission device, whether a direct radio link from the data transmission device to the first other data transmission device is possible,
  sending (605), by the data transmission device and as a response to a situation (604) in which the direct radio link is possible, a message which is addressed to the at least one second other data transmission device and which informs the at least one second other data transmission device that the data transfer from the data transmission device to the first other data transmission device is arranged to take place as direct radio communication from the data transmission device to the first other data transmission device, and
  using (606), by the data transmission device and as a response to the situation in which the direct radio link is possible, the direct radio link for the data transfer from the data transmission device to the first other data transmission device.

20. The method according to claim 19, wherein the method further comprises transmitting, prior to checking whether the direct radio link is possible, from the data transmission device to the first other data transmission device first configuration data usable for the direct radio communication, and using at the data transmission device second configuration data received from the first other data transmission device for the direct radio communication, the first and second configuration data being routed via the at least one second other data transmission device.

21. The method according to claim 19, wherein the direct radio link is used as a part of one or more connection oriented data transfer paths configured with the routing protocol into the wireless communication network.

22. The method according to claim 21, wherein the method comprises encryption of data transferred through the one or more connection oriented data transfer paths.

23. The method according to claim 19, wherein the direct radio link is used as a single hop in connectionless communication.

24. The method according to claim 23, wherein the method comprises encryption of data transferred through the direct radio link.

25. The method according to claim 19, wherein the message is addressed to the at least one second other data transmission device.

26. The method according to claim 19, wherein the message is a part of data transferred through the direct radio link to the first other data transmission device, the at least one second other data transmission device being able to receive the data transferred through the direct radio link.

27. The method according to claim 19, wherein a neighbour discovery process of the routing protocol is run at pre-determined time instants so as to update the routing information.

28. The method according to claim 19, wherein a neighbour discovery process of the routing protocol is run as a response to a need to transfer data from the data transmission device to the first other data transmission device so as to create or update the routing information.

29. The method according to claim 19, wherein a neighbour discovery process of the routing protocol is run as a response to an indication of a change in the wireless communication network so as to create or update the routing information.

30. The method according to claim 19, wherein an estimate of a distance from the data transmission device to the first other data transmission device is formed based on location co-ordinates of the data transmission device and the first other data transmission device, and the direct radio link is deemed to be possible when the distance is below a pre-determined limit value.

31. The method according to claim 19, wherein a test message is sent and the direct radio link is deemed to be possible as a response to a situation in which a reply message to the test message is received from the first other data transmission device.

32. The method according to claim 19, wherein at least one of the following is used as the routing protocol: Topology Dissemination Based on Reverse-Path Forwarding (TBRPF), Ad-hoc ON-Demand Distance Vector (AODV), Routing Over Low power and Lossy networks (ROLL).

33. The method according to claim 19, wherein at least one of the following is used for the direct radio communication from the data transmission device to the first other data transmission device: Bluetooth® radio protocol, a WLAN-radio protocol (Wireless Local Area Network).

34. The method according to claim 19, wherein higher radio transmission power is used for the direct radio communication from the data transmission device to the first other data transmission device than for communication from the data transmission device to the first other data transmission device taking place via the at least one second other data transmission device.

35. A non-transitory computer readable medium encoded with a computer program for optimizing data transfer in a wireless communication network, characterized in that the computer program comprises computer executable instructions for controlling a programmable processor of a data transmission device to:
   check, as a response to a situation in which routing information created or updated with a routing protocol indicates that data transfer from the data transmission device to a first other data transmission device is to be routed via at least one second other data transmission device, whether a direct radio link from the data transmission device to the first other data transmission device is possible, and
   control, as a response to a situation in which the direct radio link is possible, the data transmission device to send a message which is addressed to the at least one second other data transmission device and which informs the at least one second other data transmission device that the data transfer from the data transmission device to the first other data transmission device is arranged to take place as direct radio communication from the data transmission device to the first other data transmission device.

36. A wireless communication network (100) comprising:
   two or more first data transmission devices (101, 104) for wireless communication, and
   one or more second data transmission device (102, 103) for wireless communication,
   wherein each of the first data transmission devices and each of the second data transmission devices is arranged to run a routing protocol so as to enable the first data transmission devices and the one or more second data transmission devices to operate as nodes of the wireless communication network,
   wherein at least one of the first data transmission devices (101) is further arranged to:
   check, as a response to a situation in which routing information (131) created or updated with the routing protocol indicates that data transfer from this first data transmission device (101) to another of the first data transmission devices (104) is to be routed via at least one of the second data transmission devices (102, 103), whether a direct radio link (110) from this first data transmission device to the other first data transmission device is possible,
   send, as a response to a situation in which the direct radio link is possible, a message which is addressed to the at least one of the second data transmission devices and which informs the at least one second other data transmission device that the data transfer from this first data transmission device to the other first data transmission device is arranged to take place as direct radio communication from this first data transmission device to the other first data transmission device, and
   control, as a response to the situation in which the direct radio link is possible, this first data transmission device to use the direct radio link for the data transfer from this first data transmission device to the other first data transmission device.

37. The wireless communication network according to claim 36, wherein the at least one of the first data transmission devices (101) is arranged to transmit, prior to checking whether the direct radio link is possible, to the other first data transmission device (104) first configuration data usable for the direct radio communication, and to use second configuration data received from the other first data transmission device for the direct radio communication, the first and second configuration data being routed via the at least one second other data transmission device.

38. The wireless communication network according to claim 36, wherein the at least one of the first data transmission devices (101) is arranged to use higher radio transmission power for the direct radio communication from this first data transmission device (101) to the other first data transmission device (104) than for communication from this first data transmission device to the other first data transmission device taking place via the at least one second other data transmission device (102, 103).

* * * * *